United States Patent
Yokoyama et al.

(10) Patent No.: US 9,859,836 B2
(45) Date of Patent: Jan. 2, 2018

(54) MOTOR CONTROL CONSTANT CALCULATION DEVICE

(71) Applicant: Mitsubishi Electric Corporation, Tokyo (JP)

(72) Inventors: Kazuto Yokoyama, Tokyo (JP); Masahiro Iezawa, Tokyo (JP); Keiichi Enoki, Tokyo (JP); Yasufumi Ogawa, Tokyo (JP); Kotaro Nakano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/129,011

(22) PCT Filed: May 13, 2014

(86) PCT No.: PCT/JP2014/062664
§ 371 (c)(1),
(2) Date: Sep. 26, 2016

(87) PCT Pub. No.: WO2015/173878
PCT Pub. Date: Nov. 19, 2015

(65) Prior Publication Data
US 2017/0111004 A1    Apr. 20, 2017

(51) Int. Cl.
*H02P 6/16*     (2016.01)
*H02P 29/00*    (2016.01)
*G05B 17/02*    (2006.01)

(52) U.S. Cl.
CPC .............. *H02P 29/00* (2013.01); *G05B 17/02* (2013.01)

(58) Field of Classification Search
CPC .... H02P 1/166; H02P 21/143; H02P 23/0004; H02P 21/16; H02P 23/14; G05B 6/00;
(Continued)

(56) References Cited

U.S. PATENT DOCUMENTS

| | | | | |
|---|---|---|---|---|
| 2003/0076065 A1* | 4/2003 | Shafer | .................. | B62D 5/0496 318/567 |
| 2009/0097830 A1* | 4/2009 | Iwashita | ............. | H02P 23/0004 388/800 |
| 2009/0251092 A1* | 10/2009 | Zhang | .................... | G05B 11/42 318/609 |

FOREIGN PATENT DOCUMENTS

| | | |
|---|---|---|
| JP | 3561911 B2 | 9/2004 |
| JP | 2012-120412 A | 6/2012 |

(Continued)

OTHER PUBLICATIONS

International Search Report for PCT/JP2014/062664 dated Jul. 29, 2014.

*Primary Examiner* — Bickey Dhakal
(74) *Attorney, Agent, or Firm* — Sughrue Mion, PLLC; Richard C. Turner

(57) ABSTRACT

By providing a configuration for calculating motor control constants to be set in a motor control apparatus automatically on the basis of a target response time constant obtained from a target response time constant input unit, waveform parameters obtained from a waveform parameter input unit, a normalized time constant obtained from a normalized time constant calculation unit, and a motor load inertia obtained from a motor load inertia input unit, it is possible to obtain a motor control constant calculation device that can determine appropriate motor control constants for obtaining a desired response characteristic by automatic calculation while avoiding variation and an increase in the number of steps due to differences in the abilities of users.

13 Claims, 6 Drawing Sheets

(58) Field of Classification Search
CPC ................... G05B 11/36; G05B 11/42; G05B 2219/37603
USPC .............................. 318/648, 400.07, 400.15
See application file for complete search history.

(56) References Cited

FOREIGN PATENT DOCUMENTS

| | | |
|---|---|---|
| JP | 2013-192280 A | 9/2013 |
| WO | 2013/057780 A1 | 4/2013 |

* cited by examiner

MOTOR CONTROL CONSTANT CALCULATION DEVICE

CROSS REFERENCE TO RELATED APPLICATIONS

This application is a National Stage of International Application No. PCT/JP2014/062664 filed May 13, 2014, the contents of which are incorporated herein by reference in their entirety.

TECHNICAL FIELD

This invention relates to a motor control constant calculation device that calculates appropriate motor control constants to be set in a motor control apparatus in order to obtain a desired response characteristic.

BACKGROUND ART

During motor speed control, a control gain must be increased in order to improve a speed response and a robustness with which speed variation accompanying load variation is suppressed. However, a motor speed signal obtained from an encoder or a resolver includes noise, and therefore, when the control gain is increased, the noise is amplified, leading to a reduction in the stability of the motor speed. Hence, there is a limit to the control performance that can be achieved simply by increasing the control gain.

To avoid this situation, means for reducing the noise included in the motor speed signal by inserting a low pass filter (an LPF) is typically employed. However, when a cutoff frequency of the LPF is reduced in order to improve the noise reduction effect, a phase of the motor speed signal is retarded such that the speed response deteriorates.

To improve the control performance, therefore, appropriate motor control constants to be set in a motor control apparatus must be determined in consideration of the tradeoff between the control gain and the cutoff frequency of the LPF.

Here, a method of determining motor control constants through automatic calculation simply by applying a single parameter defining a desired response speed, thereby ensuring that the motor control constants are not determined by trial and error due to the tradeoff described above, has been proposed in the prior art (see PTL 1, for example).

More specifically, in the conventional technique described in PTL 1, the motor control constants are determined automatically by applying a target response frequency $\omega_f$ as the parameter defining the desired response speed. Note that the motor control constants serving as the subject of this conventional technique include a position loop gain of a position control unit of the motor control apparatus, a speed loop gain and a speed integration time constant of a speed control unit, a filter constant of a torque filter unit, a current loop gain and a current integration time constant of a current control unit, and a filter time constant of a speed signal creation unit (in other words, an LPF).

Further, in PTL 1, a speed control loop is considered as a secondary system represented only by the speed loop gain and a motor load inertia, and the speed loop gain is determined so that a characteristic equation of a transfer function having a range that extends from a target speed (a speed command) to the motor speed (an actual speed) has a repeated root. Furthermore, a calculation expression for determining the filter time constant is defined by trial and error on the basis of a stability condition of a control system and a repeatedly performed experiment.

CITATION LIST

Patent Literature

[PTL 1]
Japanese Patent Publication No. 3561911

SUMMARY OF INVENTION

Technical Problem

However, the prior art includes the following problems. In the conventional technique described in PTL 1, the speed loop gain is determined without taking into consideration the LPF that reduces the noise included in the motor speed signal. Therefore, when the LPF is eventually inserted and the motor is controlled using the determined speed loop gain, the speed response actually deteriorates relative to the target response frequency $\omega_f$ applied during the determination operation. In other words, the determined speed loop gain cannot always be considered as an appropriate motor control constant.

Further, in the conventional technique described in PTL 1, the calculation expression for determining the filter time constant is defined by trial and error. As a result, depending on the abilities of a user (an operator), optimum motor control constants may vary and a number of steps required to determine an appropriate filter time constant may increase.

This invention has been designed to solve the problems described above, and an object thereof is to obtain a motor control constant calculation device that can determine appropriate motor control constants for obtaining a desired response characteristic by automatic calculation while avoiding variation and an increase in the number of steps due to differences in the abilities of users.

Solution to Problem

A motor control constant calculation device according to this invention calculates motor control constants for a motor control apparatus so that a motor obtains a desired response characteristic, the motor control apparatus having a target speed command generation unit that generates a target speed as a speed command relating to the motor, a first LPF that implements filtering processing on a signal waveform of the target speed input from the target speed command generation unit, a second LPF that reduces noise in a signal waveform of a motor speed detected from the motor, a speed deviation calculation unit that calculates a deviation between the target speed and the motor speed after the target speed and the motor speed pass through the first LPF and the second LPF, respectively, a target motor torque calculation unit that calculates a target torque to be generated by the motor on the basis of the deviation, and an applied motor voltage calculation unit that calculates a voltage to be applied to the motor on the basis of the target torque, and outputs the calculated voltage to the motor, wherein the motor control constant calculation device includes a target response time constant input unit used to input and set a target response time constant defining a response speed so that the desired response characteristic is obtained, a waveform parameter input unit used to input and set waveform parameters defining a response waveform so that the desired response characteristic is obtained, a motor load inertia input unit used to input and set a motor load inertia of the motor, a normalized time constant calculation unit that calculates a normalized time constant on the basis of the waveform parameters obtained from the waveform parameter input unit, and a motor control constant calculation unit that calculates a filter time constant, a proportional gain, and an integral gain as motor control constants to be set in relation to the first LPF, the second LPF, and the target motor torque calculation unit on the basis of the target response time constant obtained from the target response time constant input unit, the waveform parameters obtained from the waveform parameter input unit, the normalized time constant obtained from the normalized time constant calculation unit, and the motor load inertia obtained from the motor load inertia input unit.

Advantageous Effects of Invention

According to this invention, a configuration is provided for calculating the motor control constants to be set in the motor control apparatus automatically on the basis of the target response time constant obtained from the target response time constant input unit, the waveform parameters obtained from the waveform parameter input unit, the normalized time constant obtained from the normalized time constant calculation unit, and the motor load inertia obtained from the motor load inertia input unit. As a result, it is possible to obtain a motor control constant calculation device that can determine appropriate motor control constants for obtaining a desired response characteristic by automatic calculation while avoiding variation and an increase in the number of steps due to differences in the abilities of users.

DESCRIPTION OF EMBODIMENTS

Figure 1:
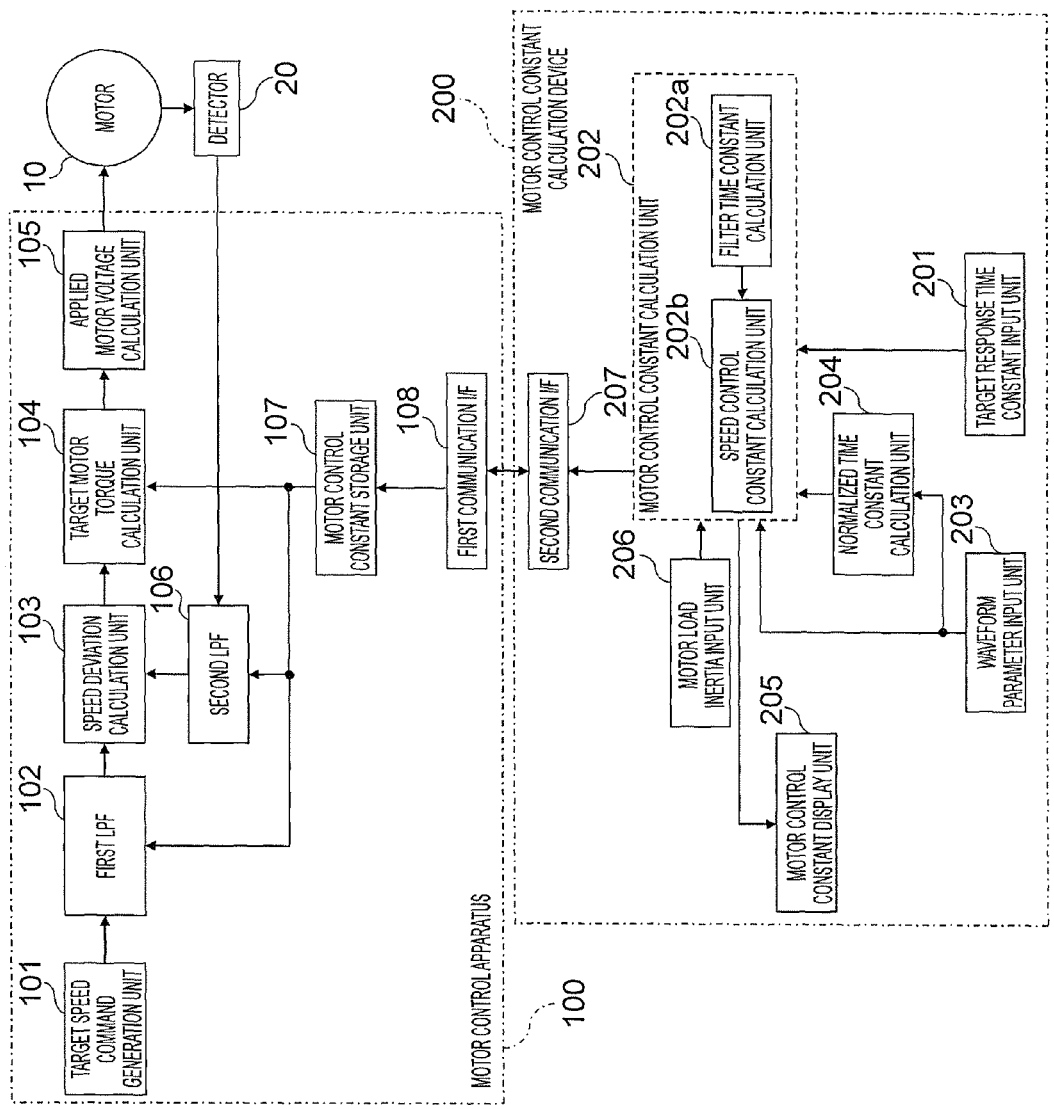
FIG. 1 is a block diagram showing an overall configuration of a motor control system including a motor control constant calculation device according to a first embodiment of this invention.

Preferred embodiments of a motor control constant calculation device according to this invention will be described below using the drawings. Note that in the drawings, identical reference numerals have been allocated to identical elements, and duplicate description thereof has been omitted.

First Embodiment

FIG. 1 is a block diagram showing an overall configuration of a motor control system including a motor control constant calculation device 200 according to a first embodiment of this invention.

In FIG. 1, the motor control system includes a motor 10, a detector 20 that is connected to the motor 10 in order to obtain a motor speed signal from the motor 10, a motor control apparatus 100 that controls driving of the motor 10, and the motor control constant calculation device 200 that calculates optimum motor control constants to be set in the motor control apparatus 100.

The motor control apparatus 100 includes a target speed command generation unit 101, a first LPF 102, a speed deviation calculation unit 103, a target motor torque calculation unit 104, an applied motor voltage calculation unit 105, a second LPF 106, a motor control constant storage unit 107, and a first communication I/F 108.

The target speed command generation unit 101 generates a target speed $\omega_{ref}$ as a speed command relating to the motor 10, and outputs the generated target speed $\omega_{ref}$ to the speed deviation calculation unit 103 via the first LPF 102. Hence, the target speed $\omega_{ref}$ is input into the speed deviation calculation unit 103 after passing through the first LPF 102, in which a signal waveform thereof is subjected to filter processing in accordance with a filter time constant. Note that hereafter, the target speed $\omega_{ref}$ after passing through the first LPF 102 will be denoted specifically as a target speed $\omega_{ref}'$.

Here, a transfer function $F_{ref}(s)$ of the first LPF 102 is expressed by Equation (A) shown below, for example, using a proportional gain $K_{vp}$, an integral gain $K_{vi}$, and a time constant (the filter time constant) $\tau_{LPF}$ of the first LPF 102.

[Math. 1]

$$F_{ref}(s) = \frac{K_{vi}}{(K_{vp}s + K_{vi})(\tau_{LPF}s + 1)} \quad (A)$$

The detector 20 detects a position of the motor 10 and outputs a motor speed $\omega$ (an actual speed) of the motor 10 as a motor speed signal on the basis of the detection result. Further, the motor speed $\omega$ output from the detector 20 is input into the speed deviation calculation unit 103 via the second LPF 106. Hence, the motor speed $\omega$ is input into the speed deviation calculation unit 103 after passing through the second LPF, in which noise is removed from a signal waveform thereof. Note that hereafter, the motor speed $\omega$ after passing through the second LPF 106 will be denoted specifically as a motor speed $\omega'$. The motor speed $\omega$ output by the detector 20 is therefore input into the second LPF 106 and fed back to the speed deviation calculation unit 103 in the form of the motor speed $\omega'$.

Here, a transfer function $F_{LPF}(s)$ of the second LPF 106 is expressed by Equation (B) shown below, for example, using the time constant (the filter time constant) $\tau_{LPF}$ of the second LPF 106.

[Math. 2]

$$F_{LPF}(s) = \frac{1}{\tau_{LPF}s + 1} \quad (B)$$

The speed deviation calculation unit 103 calculates a deviation between the target speed $\omega_{ref}'$ and the motor speed $\omega'$ input therein, or in other words a speed deviation $e_\omega$ ($=\omega_{ref}'-\omega'$), and outputs the calculated speed deviation $e_\omega$ to the target motor torque calculation unit 104.

The target motor torque calculation unit 104 calculates a target torque $T_{ref}$ of the motor 10 using the input speed deviation $e_\omega$. Further, the target motor torque calculation unit 104 outputs the calculated target torque $T_{ref}$ to the applied motor voltage calculation unit 105.

Here, a transfer function $C_{FB}(s)$ of the target motor torque calculation unit 104 is expressed by Equation (C) shown below, for example, using the proportional gain $K_{vp}$ and the integral gain $K_{vi}$.

[Math. 3]

$$C_{FB}(s) = K_{vp} + \frac{K_{vi}}{s} \quad (C)$$

The applied motor voltage calculation unit 105 calculates a voltage to be applied to the motor 10 so that a torque T generated by the motor 10 follows the input target torque $T_{ref}$, and outputs the calculated voltage to the motor 10.

The proportional gain $K_{vp}$, the integral gain $K_{vi}$, and the filter time constant $\tau_{LPF}$ are stored in the motor control constant storage unit 107 as appropriate motor control constants calculated automatically by the motor control constant calculation device 200 in order to obtain a desired response characteristic.

The first LPF 102, the target motor torque calculation unit 104, and the second LPF 106 obtain the motor control constants stored in the motor control constant storage unit 107. As a result, the appropriate motor control constants calculated automatically by the motor control constant calculation device 200 are set in the first LPF 102, the target motor torque calculation unit 104, and the second LPF 106.

The motor control constant calculation device 200 includes a target response time constant input unit 201, a motor control constant calculation unit 202, a waveform parameter input unit 203, a normalized time constant calculation unit 204, a motor control constant display unit 205, a motor load inertia input unit 206, and a second communication I/F 207. Further, the motor control constant calculation unit 202 includes a filter time constant calculation unit 202a and a speed control constant calculation unit 202b.

The target response time constant input unit 201 is used to input and set a target response time constant $\tau_d$ defining a response speed so that the motor 10 exhibits the desired response characteristic. Further, the waveform parameter input unit 203 is used to input and set waveform parameters $\gamma_1$, $\gamma_2$ defining a response waveform so that the motor 10 exhibits the desired response characteristic.

Furthermore, the motor load inertia input unit 206 is used to input and set a motor load inertia J corresponding to a load characteristic of the motor 10. By providing the target response time constant input unit 201, the waveform parameter input unit 203, and the motor load inertia input unit 206, a user can set the target response time constant $\tau_d$, the waveform parameters $\gamma_1$, $\gamma_2$, and the motor load inertia J freely, as desired, in the motor control constant calculation unit 202.

The normalized time constant calculation unit 204 calculates a normalized time constant $\tau_s$ on the basis of the waveform parameters $\gamma_1$, $\gamma_2$ obtained from the waveform parameter input unit 203, and outputs the calculated normalized time constant $\tau_s$ to the motor control constant calculation unit 202. A method of calculating the normalized time constant $\tau_s$ will now be described. In the motor control apparatus 100, a transfer function G(s) from the target speed $\omega_{ref}$ to the motor speed $\omega$ is as shown in a following equation.

[Math. 4]

$$G(s) = \frac{K_{vi}}{J\tau_{LPF}s^3 + Js^2 + K_{vp}s + K_{vi}}$$

Further, the waveform parameters $\gamma_1$, $\gamma_2$ and $\tau_e$ are defined by following equations.

[Math. 5]

$$\gamma_1 = \frac{K_{vp}^2}{JK_{vi}} \quad \gamma_2 = \frac{J}{\tau_{LPF}K_{vp}} \quad \tau_e = \frac{K_{vp}}{K_{vi}} = \tau_{LPF}\gamma_1\gamma_2$$

Using these equations, the transfer function G(s) can be rewritten as a following equation.

[Math. 6]

$$G(s) = \frac{1}{\frac{1}{\gamma_2\gamma_1^2}(\tau_e s)^3 + \frac{1}{\gamma_1}(\tau_e s)^2 + \tau_e s + 1}$$

Hence, $\tau_e s$ may be taken as a new variable such that the transfer function G(s) is considered as $G(\tau_e s)$. A response waveform of the transfer function $G(\tau_e s)$ is determined by a coefficient of a denominator polynomial, and the determined response waveform is determined univocally in accordance with values of the waveform parameters $\gamma_1$, $\gamma_2$. Further, a scale of a time direction of the response waveform is dependent on the variable $\tau_e s$, and therefore the response speed is determined from $\tau_e$. On the basis of the above, a transfer function obtained by replacing the variable $\tau_e s$ with s' and normalizing a temporal axis by $\tau_e$ is set as $G_n(s')$, and a value obtained by calculating a time constant of a step response of the transfer function $G_n(s')$ is set as the normalized time constant $\tau_s$. Note that the normalized time constant $\tau_s$ corresponds to a combination of the waveform parameters $\gamma_1$, $\gamma_2$ at a ratio of 1 to 1.

The transfer function $G_n(s')$ is expressed by Equation (D), shown below, using the waveform parameters $\gamma_1$, $\gamma_2$.

[Math. 7]

$$G_n(s') = \frac{1}{\frac{1}{\gamma_2\gamma_1^2}s'^3 + \frac{1}{\gamma_1}s'^2 + s' + 1} \quad (D)$$

The motor control constant calculation unit 202 calculates the proportional gain $K_{vp}$, the integral gain $K_{vi}$, and the filter time constant $\tau_{LPF}$ as the motor control constants to be set in the motor control apparatus 100, and outputs the calculated motor control constants to the motor control apparatus 100. As is evident from the respective transfer functions expressed above in Equations (A) to (C), the first embodiment illustrates a case in which the proportional gain $K_{vp}$, the integral gain $K_{vi}$, and the filter time constant $\tau_{LPF}$ to be set in the first LPF 102, the time constant $\tau_{LPF}$ to be set in the second LPF 106, and the proportional gain $K_{vp}$ and integral gain $K_{vi}$ to be set in the target motor torque calculation unit 104 are calculated.

The filter time constant calculation unit 202a calculates the filter time constant $\tau_{LPF}$ on the basis of the target response time constant $\tau_d$ obtained from the target response time constant input unit 201, the waveform parameters $\gamma_1, \gamma_2$ obtained from the waveform parameter input unit 203, and the normalized time constant $\tau_s$ obtained from the normalized time constant calculation unit 204 so as to satisfy Equation (E), shown below.

[Math. 8]

$$\tau_{LPF} \leq \frac{\tau_d}{\tau_s \gamma_1 \gamma_2} \quad (E)$$

A method of calculating Equation (E) will now be described. A time constant of the transfer function G(s) expressing a real-time response with respect to the normalized time constant $\tau_s$ is $\tau_e \tau_s$. Accordingly, a condition applied to the filter time constant $\tau_{LPF}$ in order to realize the target response time constant $\tau_d$ is as shown in a following equation.

$$\tau_d \geq \tau_e \tau_s = \tau_{LPF} \gamma_1 \gamma_2 \tau_s \quad \text{[Math. 9]}$$

By modifying the above expression, Equation (E) is obtained.

Further, on the basis of the calculated filter time constant $\tau_{LPF}$, the filter time constant calculation unit 202a calculates a cutoff frequency $f_{LPF}$ as a further motor control constant in accordance with Equation (F), shown below.

[Math. 10]

$$f_{LPF} = \frac{1}{2\pi \tau_{LPF}} \quad (F)$$

The speed control constant calculation unit 202b calculates the proportional gain $K_{vp}$ and the integral gain $K_{vi}$ on the basis of the waveform parameters $\gamma_1, \gamma_2$ obtained from the waveform parameter input unit 203, the motor load inertia J obtained from the motor load inertia input unit 206, and the filter time constant $\tau_{LPF}$ obtained from the filter time constant calculation unit 202a in accordance with Equations (G) and (H), shown below.

[Math. 11]

$$K_{vp} = \frac{J}{\tau_{LPF} \gamma_2} \quad (G)$$

$$K_{vi} = \frac{K_{vp}^2}{J \gamma_1} = \frac{J}{\tau_{LPF}^2 \gamma_1 \gamma_2^2} \quad (H)$$

The proportional gain $K_{vp}$, the integral gain $K_{vi}$, and the filter time constant $\tau_{LPF}$ calculated by the motor control constant calculation unit 202 in this manner are input into the motor control constant storage unit 107 via the second communication I/F 207 and the first communication I/F 108. As a result, the motor control constants calculated automatically by the motor control constant calculation unit 202 are set in the first LPF 102, the target motor torque calculation unit 104, and the second LPF 106 by the motor control constant storage unit 107.

The motor control constant display unit 205 displays the motor control constants calculated by the motor control constant calculation unit 202. As a result, the user can confirm specific numerical values of the motor control constants calculated by the motor control constant calculation unit 202 immediately by sight.

According to the first embodiment, as described above, the motor control constants to be set in the motor control apparatus are calculated automatically on the basis of the target response time constant obtained from the target response time constant input unit, the waveform parameters obtained from the waveform parameter input unit, the normalized time constant obtained from the normalized time constant calculation unit, and the motor load inertia obtained from the motor load inertia input unit.

In addition, stability in the transfer function G(s) is guaranteed logically by establishing $\gamma_1 \geq 1.5$ and $\gamma_2 \geq 1.5$. As a rule of thumb, a favorable response waveform is obtained in terms of fluctuation and overshoot by establishing $\gamma_1 = 2.5$ and $\gamma_2 = 2$. The response waveform, in contrast to the response speed, is typically somewhat limited in terms of a desired shape regardless of the aim of the motor speed control, and therefore the user preferably sets values in the vicinity of $\gamma_1 = 2.5$ and $\gamma_2 = 2$ in the waveform parameter input unit 203 in advance as default values. Further, when the motor load inertia J is fixed, the fixed motor load inertia J is preferably set in the motor load inertia input unit 206 in advance as a default value. According to this invention, the response speed and the response waveform can be adjusted independently in accordance with the target response time constant $\tau_d$ and the waveform parameters $\gamma_1, \gamma_2$, respectively, and therefore, by setting the waveform parameters $\gamma_1, \gamma_2$ and the motor load inertia J at the default values, the user can obtain motor control constants for realizing the desired response characteristic simply by applying the target response time constant $\tau_d$.

Hence, appropriate motor control constants for obtaining a desired response characteristic can be determined by automatic calculation while avoiding variation and an increase in the number of steps due to differences in the abilities of users. Moreover, even inexperienced users can set appropriate motor control constants in the motor control apparatus easily, without trial and error. As a result, variation in the control performance due to differences in the abilities of users can be prevented, and a number of development steps required for a setting operation can be greatly reduced.

Note that when the cutoff frequency $f_{LPF}$ is calculated in accordance with Equation (F) on the basis of the filter time constant $\tau_{LPF}$, which is calculated such that Equation (E) holds, (in other words, when $f_{LPF} = \tau_s \gamma_1 \gamma_2 / 2\pi \tau_d$), a following effect is obtained.

The cutoff frequency $f_{LPF}$ of the second LPF 106 logically reaches a minimum when the response characteristic of the motor 10 is within a range where the target response time constant $\tau_d$ can be achieved. Therefore, a motor speed control system with which noise can be minimized while achieving the desired response characteristic is obtained.

Second Embodiment

The motor control constant calculation device 200 according to a second embodiment of this invention differs from the motor control constant calculation device 200 according to the first embodiment (FIG. 1) as follows. The motor control constant calculation device 200 according to the second embodiment is configured similarly to the motor control constant calculation device 200 according to the first embodiment, but further includes a ramp response specification input unit 208. The following description focuses on this difference.

Figure 2:
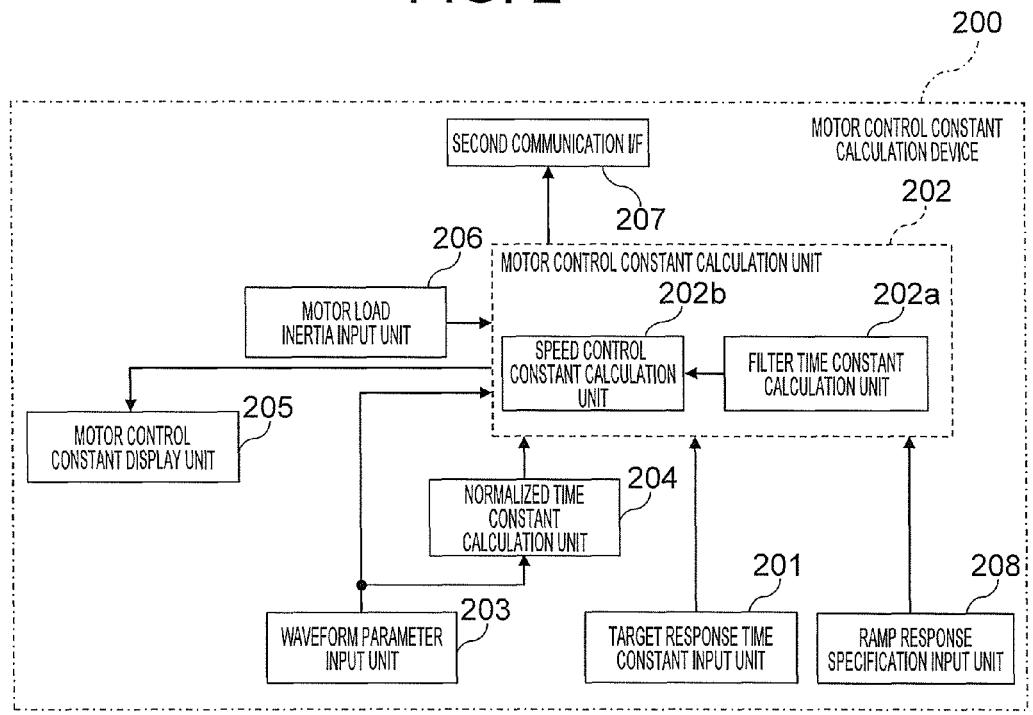
FIG. 2 is a block diagram showing a configuration of a motor control constant calculation device according to a second embodiment of this invention.

FIG. 2 is a block diagram showing a configuration of the motor control constant calculation device 200 according to the second embodiment of this invention.

The ramp response specification input unit 208 is used to input and set a target acceleration $a_{ref}$ of a ramp response and an allowable value $e_{ramp}$ of an absolute value $e_{ss}$ of a steady state deviation of the ramp response from the target acceleration as ramp response specifications so that the motor 10 exhibits a desired ramp response characteristic. By further including the ramp response specification input unit 208, the user can set desired ramp response specifications freely in the motor control constant calculation unit 202 in addition to the desired target response time constant $\tau_d$, waveform parameters $\gamma_1$, $\gamma_2$, and motor load inertia J. As a result, appropriate motor control constants for obtaining the desired response characteristic can be determined by automatic calculation while additionally taking into consideration the ramp response specifications.

In other words, the filter time constant calculation unit 202a calculates the filter time constant $\tau_{LPF}$ on the basis of the target response time constant $\tau_d$ obtained from the target response time constant input unit 201, the waveform parameters $\gamma_1$, $\gamma_2$ obtained from the waveform parameter input unit 203, the normalized time constant $\tau_s$ obtained from the normalized time constant calculation unit 204, and the target acceleration $a_{ref}$ and the allowable value $e_{ramp}$ obtained from the ramp response specification input unit 208 so as to satisfy Equation (I), shown below.

[Math. 12]

$$\tau_{LPF} \le \min\left(\frac{\tau_d}{\tau_s \gamma_1 \gamma_2}, \frac{e_{ramp}}{|a_{ref}|\gamma_1 \gamma_2}\right) \quad (I)$$

To describe the right side of Equation (I) further, the sign min $(\tau_d/\tau_s\gamma_1\gamma_2, e_{ramp}/|a_{ref}|\gamma_1\gamma_2)$ means that the respective values of $\tau_d/\tau_s\gamma_1\gamma_2$ and $e_{ramp}/|a_{ref}|\gamma_1\gamma_2$ are compared, and the smaller thereof is taken.

A method of calculating Equation (I) is as follows. In the transfer function G(s) from the target speed $\omega_{ref}$ to the motor speed $\omega$, the absolute value $e_{ss}$ of the steady state deviation of the ramp response when the target acceleration is set at $a_{ref}$ is as shown by a following equation.

$$e_{ss} = |a_{ref}|\tau_{LPF}\gamma_1\gamma_2 \quad \text{[Math. 13]}$$

A condition that is applied to the filter time constant $\tau_{LPF}$ in order to suppress the absolute value $e_{ss}$ of the steady state deviation of the ramp response to or below the allowable value $e_{ramp}$ is obtained from the above equation, and by combining this condition with the conditional expression (E) relating to the target response time constant $\tau_d$, Equation (I) is obtained.

The filter time constant calculation unit 202a calculates the cutoff frequency $f_{LPF}$ in accordance with Equation (F) on the basis of the filter time constant $\tau_{LPF}$ calculated as described above.

Further, the speed control constant calculation unit 202b calculates the proportional gain $K_{vp}$ and the integral gain $K_{vi}$ in accordance with Equations (G) and (H) on the basis of the filter time constant $\tau_{LPF}$ calculated as described above.

Hence, in the second embodiment, appropriate motor control constants can be calculated taking into consideration both the target response speed and the ramp response specifications.

According to the second embodiment, as described above, the ramp response specification input unit, which is used to input and set the target acceleration of the ramp response and the allowable value of the steady state deviation from the target acceleration as ramp response specifications enabling the motor to realize a desired ramp response characteristic, is provided in addition to the first embodiment, and therefore a configuration for calculating the motor control constants on the basis of the ramp response specifications obtained from the ramp response specification input unit is provided.

As a result, appropriate motor control constants calculated in consideration of both the target response speed and the ramp response specifications can be set in the motor control apparatus.

Note that when the cutoff frequency $f_{LPF}$ is calculated in accordance with Equation (F) on the basis of the filter time constant $\tau_{LPF}$, which is calculated such that Equation (I) holds, a following effect is obtained.

The cutoff frequency $f_{LPF}$ of the second LPF 106 logically reaches a minimum when the response characteristic of the motor 10 is within a range set in consideration of both the target response time constant $\tau_d$ and the allowable value $e_{ramp}$ of the absolute value $e_{ss}$ of the steady state deviation of the ramp response from the target acceleration. Therefore, a motor speed control system with which noise can be minimized while taking into consideration the desired speed characteristic and the ramp response specifications as the desired response characteristic is obtained.

Third Embodiment

The motor control constant calculation device 200 according to a third embodiment of this invention differs from the motor control constant calculation device 200 according to the first embodiment (FIG. 1) as follows. In comparison with the control constant calculation device 200 according to the first embodiment, the motor control constant calculation device 200 according to the third embodiment includes a filter time constant input unit 209 in place of the target response time constant input unit 201, and includes a target response time constant calculation unit 202c in place of the filter time constant calculation unit 202a. The following description focuses on these differences.

Figure 3:
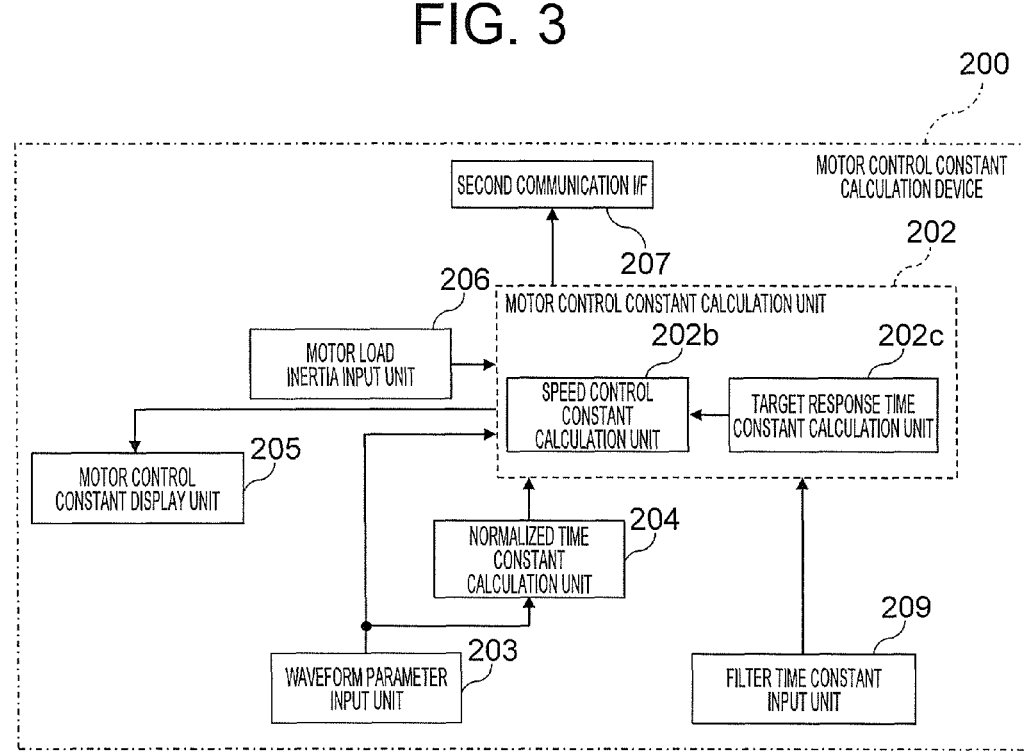
FIG. 3 is a block diagram showing a configuration of a motor control constant calculation device according to a third embodiment of this invention.

FIG. 3 is a block diagram showing a configuration of the motor control constant calculation device 200 according to the third embodiment of this invention. Further, since the ramp response specifications of the second embodiment are not set, the target response time constant $\tau_d$ and the filter time constant $\tau_{LPF}$ have a 1 to 1 relationship, as is evident from Equation (E). Accordingly, the motor control constant calculation device 200 can be configured as shown in FIG. 3.

The filter time constant input unit 209 is used to input and set the filter time constant $\tau_{LPF}$ so that the motor 10 exhibits the desired response characteristic. By providing the filter time constant input unit 209 in place of the target response time constant input unit 201 in this manner, the user can set the desired filter time constant $\tau_{LPF}$ freely in the motor control constant calculation unit 202.

The target response time constant calculation unit 202c calculates the target response time constant $\tau_d$ on the basis of the filter time constant $\tau_{LPF}$ obtained from the filter time constant input unit 209, the waveform parameters $\gamma_1$, $\gamma_2$ obtained from the waveform parameter input unit 203, and the time constant $\tau_s$ obtained from the normalized time constant calculation unit 204 so as to satisfy Equation (J), shown below.

[Math. 14]

$$\tau_d \geq \tau_{LPF} \tau_s \gamma_1 \gamma_2 \qquad (J)$$

Further, the speed control constant calculation unit 202*b* calculates the proportional gain $K_{vp}$ and the integral gain $K_{vi}$ in accordance with Equations (G) and (H) on the basis of the filter time constant $\tau_{LPF}$ obtained from the filter time constant input unit 209.

According to the third embodiment, as described above, a configuration for calculating the motor control constants to be set in the motor control apparatus automatically on the basis of the filter time constant obtained from the filter time constant input unit, the waveform parameters obtained from the waveform parameter input unit, the normalized time constant obtained from the normalized time constant calculation unit, and the motor load inertia obtained from the motor load inertia input unit is provided in addition to the first embodiment.

Hence, the filter time constant $\tau_{LPF}$ can be input and set so as to prioritize noise reduction, and as a result, similar effects to the first embodiment can be obtained.

Note that when $\tau_d$ is calculated such that Equation (J) holds (in other words, when $\tau_d = \tau_{LPF} \tau_s \gamma_1 \gamma_2$), a following effect is obtained.

The target response time constant $\tau_d$ logically reaches a minimum within a range that is achievable when the filter time constant $\tau_{LPF}$ obtained from the filter time constant input unit 209 is set as the time constant of the second LPF 106. The third embodiment is therefore effective in a case where the motor control constants are set so as to prioritize noise reduction over the response speed.

For example, when the motor is used as a propulsion device for a vehicle, a resolver is typically employed as a motor rotation angle detector. However, a pulse (a resolver pulse) that is synchronous with the motor rotation angle may be superimposed on the resolver output due to an attachment error in the resolver or an electric circuit characteristic. Further, the resolver pulse is generated at a frequency that is synchronous with the motor rotation angle. Therefore, by inputting and setting the filter time constant $\tau_{LPF}$ in the filter time constant input unit 209 in consideration of this frequency, the effect of the pulse can be reduced preferentially, and as a result, a motor speed control system exhibiting the fastest achievable speed response can be obtained.

Fourth Embodiment

The motor control constant calculation device 200 according to a fourth embodiment of this invention differs from the motor control constant calculation device 200 according to the first embodiment (FIG. 1) as follows. The motor control constant calculation device 200 according to the fourth embodiment is configured similarly to the motor control constant calculation device 200 according to the first embodiment, but further includes a normalized waveform display unit 210. The following description focuses on this difference.

Figure 4:
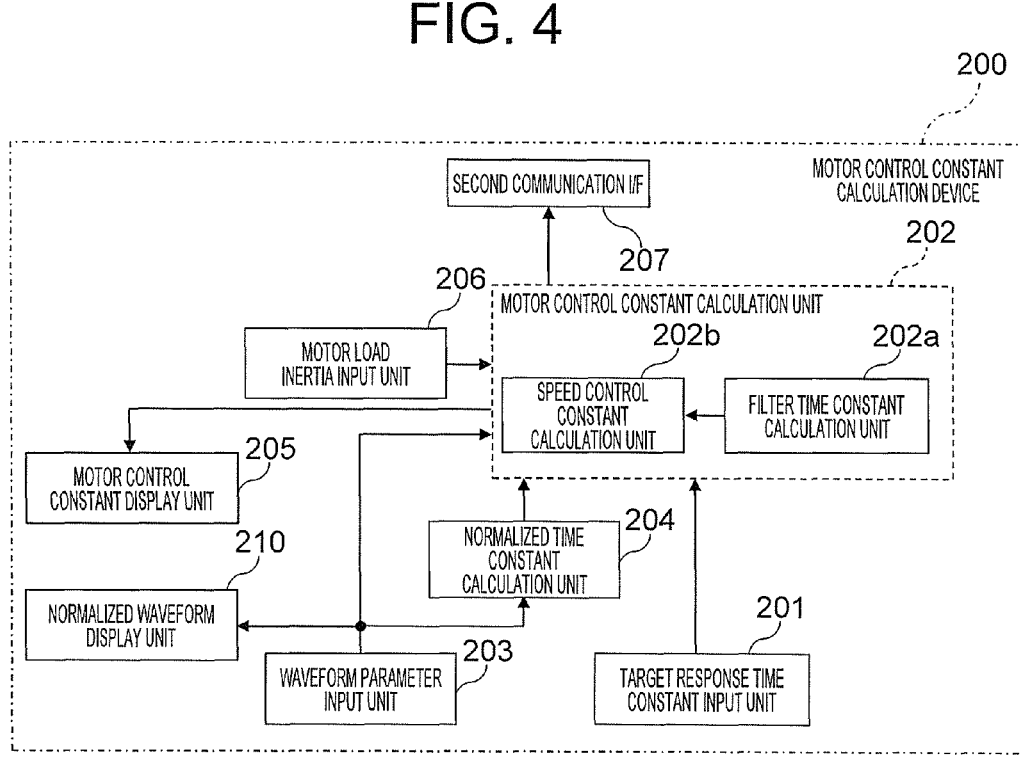
FIG. 4 is a block diagram showing a configuration of a motor control constant calculation device according to a fourth embodiment of this invention.

FIG. 4 is a block diagram showing a configuration of the motor control constant calculation device 200 according to the fourth embodiment of this invention.

According to this invention, the response speed and the response waveform can be adjusted independently in accordance with the target response time constant $\tau_d$ and the waveform parameters $\gamma_1$, $\gamma_2$, respectively.

Therefore, by varying the waveform parameters $\gamma_1$, $\gamma_2$ input and set in the waveform parameter input unit 203, a degree of fluctuation and a degree of overshoot in the step response can be set independently while continuing to satisfy the target response speed.

The normalized waveform display unit 210 displays a response waveform relating to $G_n(s')$, which is obtained by normalizing the temporal axis of the transfer function G(s) from the target speed $\omega_{ref}$ to the motor speed $\omega$ by $\tau_e$, on the basis of the waveform parameters $\gamma_1$, $\gamma_2$ obtained from the waveform parameter input unit 203.

As a result, the user can select the waveform parameters $\gamma_1$, $\gamma_2$ for realizing the desired response waveform visually by checking the display on the normalized waveform display unit 210 while varying the waveform parameters $\gamma_1$, $\gamma_2$ input and set in the waveform parameter input unit 203. Moreover, since the waveform parameters $\gamma_1$, $\gamma_2$ can be selected visually in this manner, the degree of fluctuation and the degree of overshoot can be adjusted easily while continuing to satisfy the desired response characteristics (the target response speed and the ramp response specifications).

Figure 5:
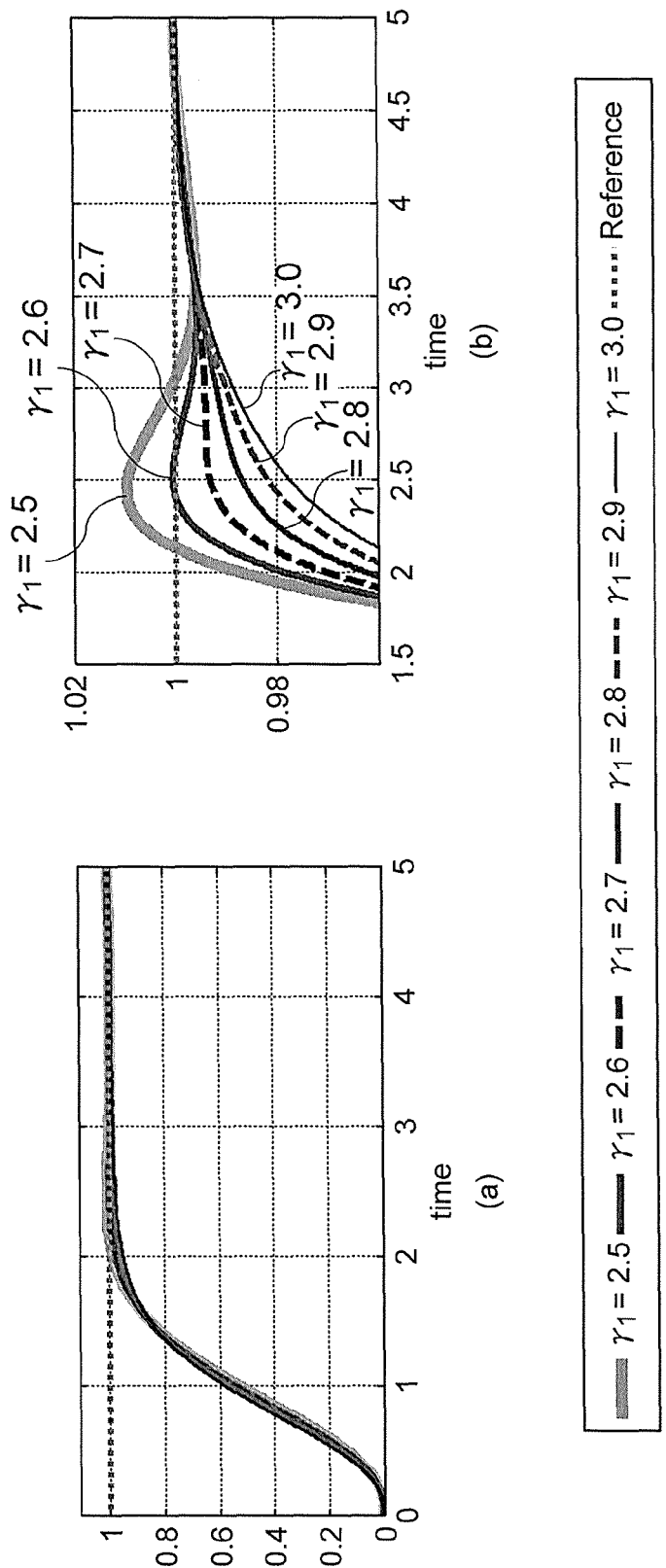
FIG. 5 is an illustrative view showing an example of a response waveform displayed by a normalized waveform display unit of the motor control constant calculation device according to the fourth embodiment of this invention.

Here, an example of a response waveform displayed by the normalized waveform display unit 210 will be described with reference to FIG. 5. FIG. 5 is an illustrative view showing an example of a response waveform displayed by the normalized waveform display unit 210 of the motor control constant calculation device 200 according to the fourth embodiment of this invention. Note that as a specific example of a response waveform relating to the transfer function $G_n(s')$, FIG. 5 shows a response waveform of the step response of the transfer function.

FIG. 5(*a*) shows respective response waveforms displayed in a case where the user inputs the waveform parameters $\gamma_1$, $\gamma_2$ into the waveform parameter input unit 203 so as to vary the waveform parameter $\gamma_1$ while keeping the waveform parameter $\gamma_2$ fixed at $\gamma_2 = 2$. Further, FIG. 5(*b*) shows an enlargement of the vicinity of target values in the response waveforms shown in FIG. 5(*a*).

According to the fourth embodiment, as described above, the normalized waveform display unit for displaying a response waveform relating to the transfer function $G_n(s')$ on the basis of the waveform parameters obtained from the waveform parameter input unit is provided in addition to the configurations of the first to third embodiments.

As a result, the waveform parameters can be selected visually while checking the display on the normalized waveform display unit, and the degrees of fluctuation and overshoot occurring during speed control can be adjusted easily regardless of the real-time response speed.

Fifth Embodiment

The motor control constant calculation device 200 according to a fifth embodiment of this invention differs from the motor control constant calculation device 200 according to the first embodiment (FIG. 1) as follows. The motor control constant calculation device 200 according to the fifth embodiment is configured similarly to the motor control constant calculation device 200 according to the first embodiment, but further includes a response waveform display unit 211 and a numerical analysis condition input unit 212. The following description focuses on this difference.

Figure 6:
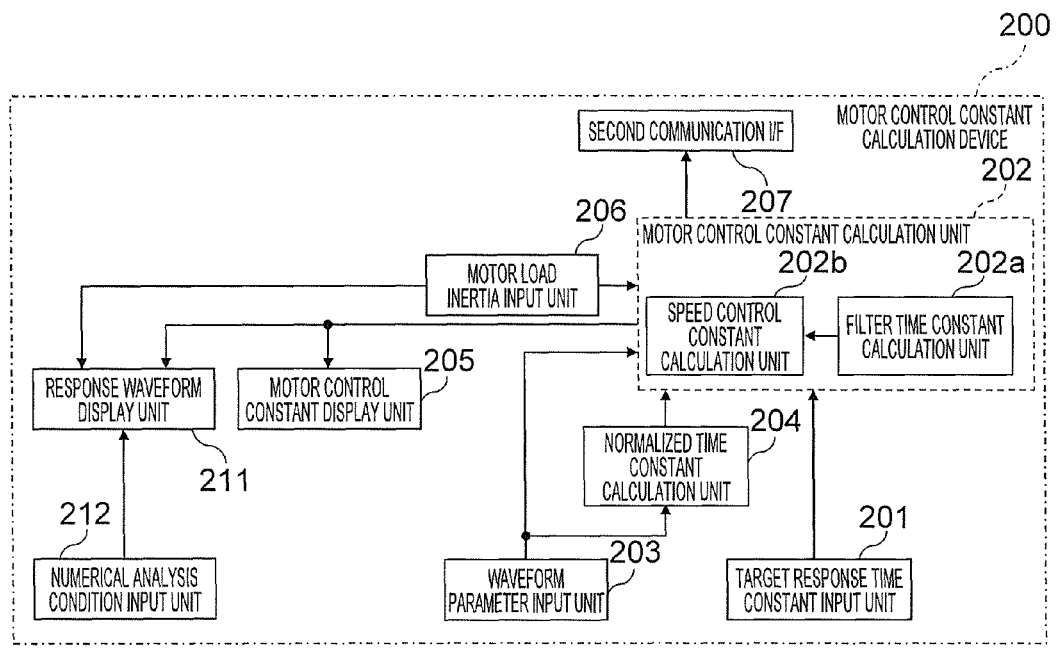
FIG. 6 is a block diagram showing a configuration of a motor control constant calculation device according to a fifth embodiment of this invention.

FIG. 6 is a block diagram showing a configuration of the motor control constant calculation device 200 according to the fifth embodiment of this invention.

The response waveform display unit 211 executes numerical analysis under numerical analysis conditions input into the numerical analysis condition input unit 212 using the motor control constants calculated by the motor control constant calculation unit 202 and the motor load inertia J obtained from the motor load inertia input unit 206, and displays the response waveform of the motor 10 in the form of a simulation result.

The numerical analysis condition input unit 212 is used to input and set analysis conditions. By providing the numerical analysis condition input unit 212, the user can set desired numerical analysis conditions freely in the response waveform display unit 211.

Note that an initial speed and a target speed of the step response, an initial speed, a target speed, and a target acceleration of the ramp response, a target speed of a constant speed response, and an amplitude, a phase, and a frequency of the noise superimposed on the motor speed signal, for example, are input as the numerical analysis conditions.

Hence, the response waveform display unit 211 displays a simulation result obtained by executing numerical analysis. As a result, the user can immediately confirm by numerical analysis whether or not it will be possible to achieve the desired control performance when the motor control constants calculated by the motor control constant calculation unit 202 are set in the motor control apparatus 100.

Here, the response waveform display unit 211 may be used in the following form, for example. Specifically, when the motor is used as a propulsion device for a vehicle, a resolver is typically employed as a motor rotation angle detector.

However, a pulse that is synchronous with the motor rotation angle may be superimposed on the resolver output due to an attachment error in the resolver or an electric circuit characteristic. Further, a resolver output signal is converted into a speed signal by differentiation and used during the speed control, but due to the effect of the pulse superimposed on the speed signal, a torque command output to the motor fluctuates. As a result, variation occurs in the motor speed, and the magnitude of the variation is dependent on the motor control constants set in the motor control apparatus 100.

Hence, by inputting the amplitude, phase, and frequency of the resolver pulse into the numerical analysis condition input unit 212 as noise and checking the control performance from the display on the response waveform display unit 211, a prior inspection can be performed on the motor 10 immediately under conditions resembling an actual environment, and as a result, the number of development steps can be reduced.

According to the fifth embodiment, as described above, the numerical analysis condition input unit used to input and set the numerical analysis conditions, and the response waveform display unit that executes numerical analysis under the numerical analysis conditions obtained from the numerical analysis condition input unit using the motor control constants calculated by the motor control constant calculation unit and the motor load inertia obtained from the motor load inertia input unit, and displays the response waveform of the motor, are provided in addition to the configurations of the first to fourth embodiments.

Accordingly, whether or not the motor is able to achieve the desired control performance under the numerical analysis conditions input and set in the numerical analysis condition input unit can immediately be verified by sight. As a result, the number of development steps can be reduced.

Sixth Embodiment

The motor control constant calculation device 200 according to a sixth embodiment of this invention differs from the motor control constant calculation device 200 according to the first embodiment (FIG. 1) as follows. The motor control constant calculation device 200 according to the sixth embodiment is configured similarly to the motor control constant calculation device 200 according to the first embodiment, but further includes a motor load inertia calculation unit 213. The following description focuses on this difference.

Figure 7:
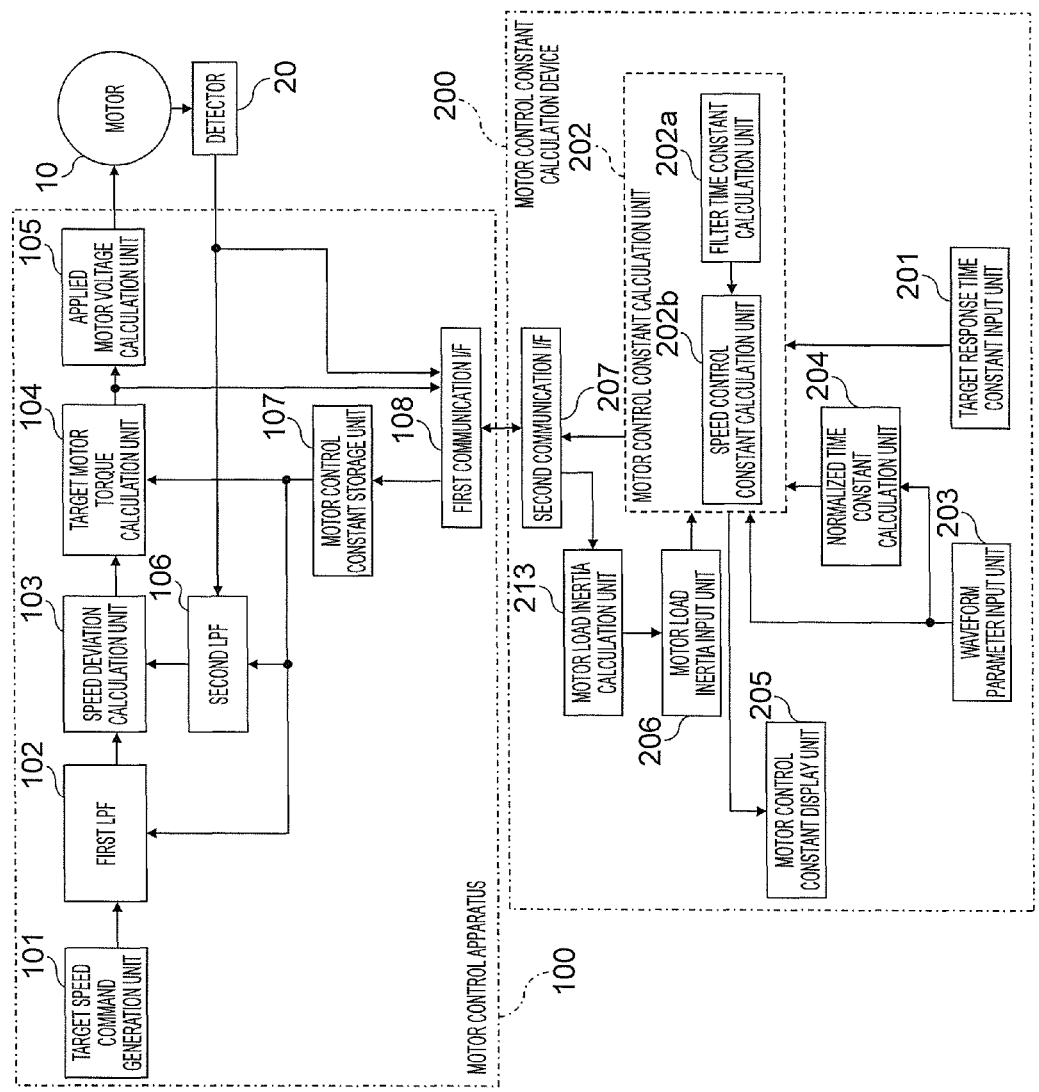
FIG. 7 is a block diagram showing a configuration of a motor control system including a motor control constant calculation device according to a sixth embodiment of this invention.

FIG. 7 is a block diagram showing a configuration of a motor control system including the motor control constant calculation device 200 according to the sixth embodiment of this invention.

In the sixth embodiment, the detector 20 outputs the motor speed ω obtained from the motor 10 to the motor load inertia calculation unit 213 via the first communication I/F 108. Further, the target motor torque calculation unit 104 outputs the calculated target torque $T_{ref}$ to the motor load inertia calculation unit 213 via the first communication I/F 108.

The motor load inertia calculation unit 213 calculates the motor load inertia J on the basis of the motor speed ω and the target torque $T_{ref}$, which are obtained via the second communication I/F 207, and outputs the calculated motor load inertia J to the motor load inertia input unit 206. Various methods may be employed by the motor load inertia calculation unit 213 to calculate the motor load inertia J. For example, when an angular acceleration obtained by numerically differentiating the motor speed ω is set as a, the motor load inertia J is calculated in accordance with Equation (K), shown below. Note that hereafter, the motor load inertia J calculated by the motor load inertia calculation unit 213 will be denoted specifically as a motor load inertia J'.

[Math. 15]

$$J = \frac{T_{ref}}{a} \quad (K)$$

The motor load inertia input unit 206 receives the newly set motor load inertia J' from the motor load inertia calculation unit 213, and outputs the motor load inertia J' to the motor control constant calculation unit 202. Hence, the motor load inertia J input and set previously in the motor load inertia input unit 206 is updated successively such that the new motor load inertia J' calculated by the motor load inertia calculation unit 213 is set therein, whereupon the updated motor load inertia J' is output to the motor control constant calculation unit 202.

Further, the motor control constant calculation unit 202 uses the motor load inertia J' updated by the motor load inertia input unit 206 to calculate the motor control constants. Hence, when load variation occurs in the motor 10, the motor control constant calculation unit 202 can calculate motor control constants that correspond to the load variation.

Here, when the motor is used as a propulsion device for a vehicle, for example, variation in a vehicle weight caused by passengers and luggage, variation in road surface friction, the effect of gravity in a downhill direction when traveling uphill, and so on, for example, may be cited as specific examples of causes of load variation in the motor 10. With the configuration of the sixth embodiment, however, the motor control constant calculation unit 202 calculates motor control constants that correspond to the load variation, and therefore speed control can be implemented on the vehicle on the basis of appropriate motor control constants for obtaining the desired response characteristic.

According to the sixth embodiment, as described above, the motor load inertia calculation unit that calculates the motor load inertia on the basis of the target speed and the target torque obtained from the motor control apparatus is provided in addition to the configurations of the first to fifth embodiments. Furthermore, the motor load inertia input unit according to the sixth embodiment is configured to update the input and set motor load inertia successively to the motor load inertia calculated by the motor load inertia calculation unit, and output the updated motor load inertia to the motor control constant calculation unit.

Hence, when the motor load inertia varies, motor control constants that correspond to the load variation can be calculated. As a result, by setting these motor control constants anew in the motor control apparatus, the motor can be controlled on the basis of appropriate motor control constants for obtaining the desired response characteristic.

Note that in the sixth embodiment, when a value of the motor load inertia J following variation therein is known in advance by the motor load inertia calculation unit 213, a following configuration may be employed. Specifically, motor control constants corresponding to a plurality of motor load inertia values J may be calculated in advance, whereupon associations (a table, for example) between the motor load inertia values J and the motor control constants may be defined in advance and stored in a storage unit of the motor control constant calculation unit 202.

In this case, the motor load inertia calculation unit 213 outputs the motor load inertia J corresponding to the motor load variation, which is known in advance, to the motor load inertia input unit 206 without obtaining the motor speed ω and the target torque $T_{ref}$ from the motor control apparatus 100 online and recalculating the motor load inertia J.

With this configuration, the motor control constant calculation unit 202 can select appropriate motor control constants corresponding to the motor load variation, which is known in advance, directly from the storage unit (the associations). In other words, the motor control constant calculation unit 202 selects appropriate motor control constants corresponding to the motor load inertia J obtained from the motor load inertia input unit 206 directly from the storage unit (the associations).

Further, by setting the motor control constants selected directly from the storage unit in the motor control apparatus 100, the motor 10 can be controlled on the basis of appropriate motor control constants without recalculating the motor load inertia J and updating the motor load inertia input unit 206. Furthermore, by setting the motor control constants selected directly from the storage unit in the motor control apparatus 100, the motor 10 can be controlled on the basis of appropriate motor control constants even in a situation where it is difficult to update the value of the motor load inertia J with a high degree of precision due to a disturbance in the motor speed signal caused by sensor noise, outside disturbances, and so on.

More specifically, in a vehicle that uses the motor 10 as a propulsion device, for example, a gear change performed by a transmission constitutes motor load variation. Further, speed ratios that can be obtained by the transmission are often known in advance. Therefore, motor control constants corresponding to a plurality of speed ratios may be calculated in advance and stored in the storage unit of the motor control constant calculation unit 202.

In this case, the motor control constant calculation unit 202 selects appropriate motor control constants corresponding to the speed ratio, which is known in advance, directly from the storage unit. Hence, even when load variation occurs in response to a gear change, the vehicle can be caused to travel on the basis of appropriate motor control constants without obtaining the motor speed ω and the target torque $T_{ref}$ from the motor control apparatus 100 online and recalculating the motor load inertia J.

The invention claimed is:

1. A motor control constant calculation apparatus that calculates motor control constants for a motor control apparatus so that a motor exhibits a desired response characteristic, wherein the motor control apparatus includes a first communication interface and is configured to generate a target speed as a speed command relating to the motor, control a first low pass filter (LPF) to implement filtering processing on a signal waveform of the generated target speed, control a second LPF to reduce noise in a signal waveform of a motor speed detected from the motor, calculate a deviation between the target speed and the motor speed after the signal waveform of the target speed passes through the first LPF and the signal waveform of the motor speed passes through the second LPF, calculate a target torque to be generated by the motor on the basis of the calculated deviation, calculate a voltage to be applied to the motor on the basis of the calculated target torque, and output the calculated voltage to the motor, and wherein the motor control constant calculation apparatus is configured to receive an input of a target response time constant and set the target response time constant which defines a response speed for obtaining the desired response characteristic, to receive an input of waveform parameters and set the waveform parameters which define a response waveform for obtaining the desired response characteristic, to receive an input of a motor load inertia and set the motor load inertia of the motor, to calculate a normalized time constant on the basis of the set waveform parameters, to calculate the motor control constants including a filter time constant, a proportional gain, and an integral gain to be set in relation to the first LPF, the second LPF, and a calculation of the target torque based on the set target response time constant, the set waveform parameters, the normalized time constant, and the set motor load inertia, and to control a second communication interface to send the calculated motor constants to the motor control apparatus through the first communication interface.

2. The motor control constant calculation apparatus according to claim 1, wherein the motor control constant calculation apparatus is configured to receive an input of a target acceleration and set the target acceleration of a ramp response and an allowable value of a steady state deviation from the target acceleration as ramp response specifications so that the motor exhibits a desired ramp response characteristic, and to calculate the motor control constants further based on the ramp response specifications.

3. The motor control constant calculation apparatus according to claim 2, wherein, in Equations (O), (P), and (Q), $$\tau_{LPF} \leq \min\left(\frac{\tau_d}{\tau_s \gamma_1 \gamma_2}, \frac{e_{ramp}}{|a_{ref}|\gamma_1 \gamma_2}\right) \quad (O)$$

$$K_{vp} = \frac{J}{\tau_{LPF}\gamma_2} \quad (P)$$

$$K_{vi} = \frac{K_{vp}^2}{J\gamma_1} = \frac{J}{\tau_{LPF}^2 \gamma_1 \gamma_2^2} \quad (Q)$$

the motor control constant calculation apparatus calculates the filter time constant to satisfy Equation (O), and calculates the proportional gain and the integral gain to satisfy Equations (P) and (Q),
where $\tau_{LPF}$ denotes the filter time constant,
$a_{ref}$ denotes the target acceleration of the ramp response,
$e_{ramp}$ denotes the allowable value of the steady state deviation of the ramp response from the target acceleration,
$\tau_d$ denotes the target response time constant,
$\gamma_1$, $\gamma_2$ denote the waveform parameters,
$\tau_s$ denotes the normalized time constant,
$K_{vp}$ denotes the proportional gain,
$K_{vi}$ denotes the integral gain, and
J denotes the motor load inertia.

4. The motor control constant calculation apparatus according to claim 1, wherein, in Equations (L), (M), and (N), $$\tau_{LPF} \leq \frac{\tau_d}{\tau_s \gamma_1 \gamma_2} \quad (L)$$

$$K_{vp} = \frac{J}{\tau_{LPF}\gamma_2} \quad (M)$$

$$K_{vi} = \frac{K_{vp}^2}{J\gamma_1} = \frac{J}{\tau_{LPF}^2 \gamma_1 \gamma_2^2} \quad (N)$$

the motor control constant calculation apparatus calculates the filter time constant to satisfy Equation (L), and calculates the proportional gain and the integral gain to satisfy Equations (M) and (N),
where $\tau_{LPF}$ denotes the filter time constant,
$\tau_d$ denotes the target response time constant,
$\gamma_1$, $\gamma_2$ denote the waveform parameters,
$\tau_s$ denotes the normalized time constant,
$K_{vp}$ denotes the proportional gain,
$K_{vi}$ denotes the integral gain, and
J denotes the motor load inertia.

5. The motor control constant calculation apparatus according to claim 1, further comprising:
a normalized waveform display to display, on the basis of the set waveform parameters, a response waveform relating to a transfer function that is obtained by normalizing the transfer function from the target speed to the motor speed by the normalized time constant.

6. The motor control constant calculation apparatus according to claim 1, further comprising:
a response waveform display,
wherein the motor control constant calculation apparatus is configured to receive an input of numerical analysis conditions and set the numerical analysis conditions, and to execute numerical analysis under the set numerical analysis conditions using the calculated motor control constants and the set motor load inertia, and
the response waveform display displays a response waveform of the motor.

7. The motor control constant calculation apparatus according to claim 1, wherein the motor control constant calculation apparatus is configured to calculate the motor load inertia on the basis of the target speed and the target torque obtained from the motor control apparatus, and to successively update the set motor load inertia with the calculated motor load inertia.

8. The motor control constant calculation apparatus according to claim 1, wherein the motor control constant calculation apparatus includes a storage unit, and is configured to control the storage unit to store motor control constants calculated in advance so as to correspond to a plurality of motor load inertia values, and to select appropriate motor control constants corresponding to a motor load variation that is known in advance directly from the storage unit.

9. A motor control constant calculation apparatus that calculates motor control constants for a motor control apparatus so that a motor exhibits a desired response characteristic,
wherein the motor control apparatus includes a first communication interface and is configured to generate a target speed as a speed command relating to the motor, control a first low pass filter (LPF) to implement filtering processing on a signal waveform of the generated target speed, control a second LPF to reduce noise in a signal waveform of a motor speed detected from the motor, calculate a deviation between the target speed and the motor speed after the signal waveform of the target speed passes through the first LPF and the signal waveform of the motor speed passes through the second LPF, calculate a target torque to be generated by the motor based on the calculated deviation, calculate a voltage to be applied to the motor based on the calculated target torque, and output the calculated voltage to the motor,
and
wherein the motor control constant calculation apparatus is
configured to receive an input of a filter time constant and set the filter time constant to be used in the first LPF and the second LPF for obtaining the desired response characteristic, to receive an input of waveform parameters and set the waveform parameters which define a response waveform for obtaining the desired response characteristic, to receive an input of a motor load inertia and set the motor load inertia of the motor, to calculate a normalized time constant based on the set waveform parameters, to calculate the motor control constants including a proportional gain and an integral gain to be set in relation to the first LPF, the second LPF, and a calculation of the target torque on the basis of the set filter time constant, the set waveform parameters, the normalized time constant, and the set motor load inertia, and to control a second communication interface to send the calculated motor constants to the motor control apparatus through the first communication interface.

10. The motor control constant calculation apparatus according to claim 9, further comprising:
a normalized waveform display to display, on the basis of the set waveform parameters, a response waveform relating to a transfer function that is obtained by normalizing the transfer function from the target speed to the motor speed by the normalized time constant.

11. The motor control constant calculation apparatus according to claim 9, further comprising:
a response waveform display,
wherein the motor control constant calculation apparatus is configured to receive an input of numerical analysis conditions and set the numerical analysis conditions, and to execute numerical analysis under the set numerical analysis conditions using the calculated motor control constants and the set motor load inertia, and the response waveform display displays a response waveform of the motor.

12. The motor control constant calculation apparatus according to claim 9, wherein the motor control constant calculation apparatus is configured to calculate the motor load inertia based on the motor speed and the target torque obtained from the motor control apparatus, and to successively update the set motor load inertia with the calculated motor load inertia.

13. The motor control constant calculation apparatus according to claim 9, wherein the motor control constant calculation apparatus includes a storage unit, and is configured to control the storage unit to store motor control constants calculated in advance so as to correspond to a plurality of motor load inertia values, and to select appropriate motor control constants corresponding to a motor load variation that is known in advance directly from the storage unit.

* * * * *